Figure 1:
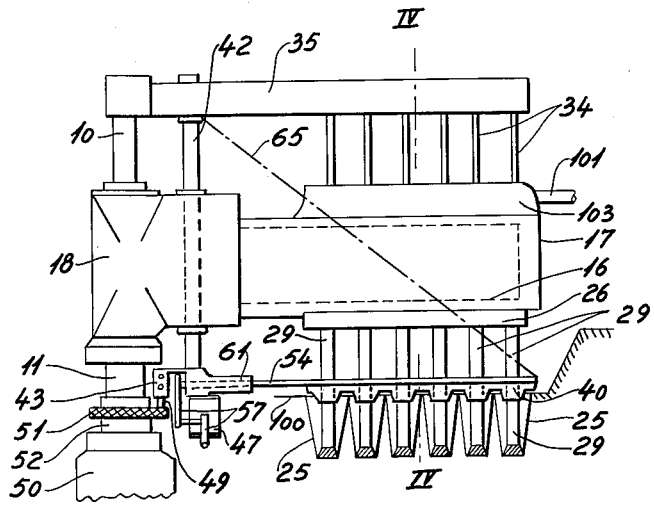

March 28, 1961  H. GRAM  2,976,896
SPOUTS FOR THE DISCHARGE OF VISCOUS MATERIALS
AND IN METHODS AND DEVICES FOR LIBERATING THE
SPOUT FOR THE DISCHARGED VISCOUS MATERIAL
Filed Sept. 10, 1957  5 Sheets-Sheet 1

INVENTOR
Hans Gram

BY
Watson, Cole, Grindle + Watson
ATTORNEYS

March 28, 1961
H. GRAM
2,976,896
SPOUTS FOR THE DISCHARGE OF VISCOUS MATERIALS
AND IN METHODS AND DEVICES FOR LIBERATING THE
SPOUT FOR THE DISCHARGED VISCOUS MATERIAL
Filed Sept. 10, 1957
5 Sheets-Sheet 2
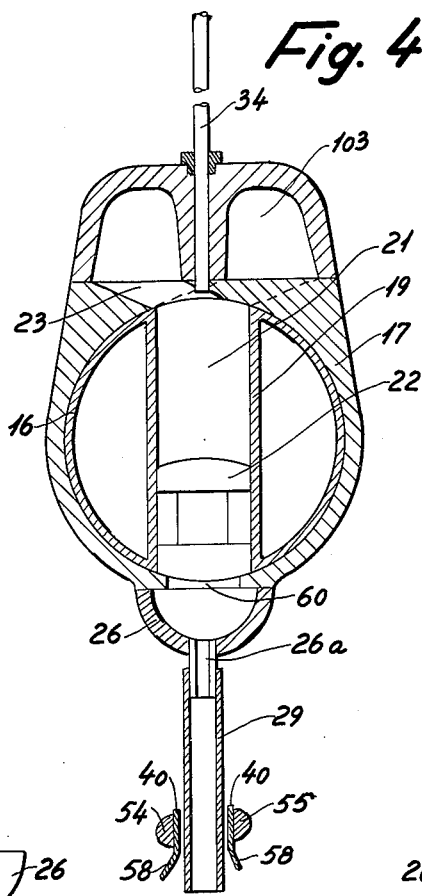
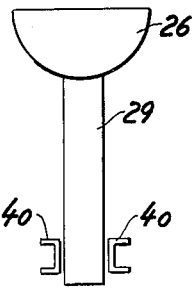
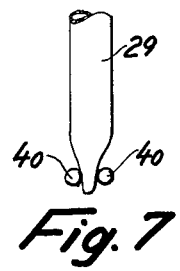
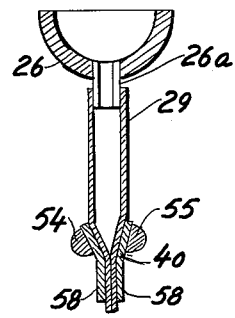
INVENTOR
Hans Gram
BY
Watson, Cole, Grindle & Watson
ATTORNEYS United States Patent Office 2,976,896
Patented Mar. 28, 1961

2,976,896

SPOUTS FOR THE DISCHARGE OF VISCOUS MATERIALS AND IN METHODS AND DEVICES FOR LIBERATING THE SPOUT FOR THE DISCHARGED VISCOUS MATERIAL

Hans Gram, Vojens, Denmark

Filed Sept. 10, 1957, Ser. No. 683,107

Claims priority, application Denmark Sept. 19, 1956

6 Claims. (Cl. 141—1)

The invention relates to methods and plants for conveying a number of measured amounts of a swelled moldable mass adapted for freezing from a filling device for separating measured amounts from said mass down into a corresponding number of pockets arranged each to receive a separate one of said amounts through a separate spout supported by said device and providing a collapsible portion. More especially the invention relates to methods and plants of the kind referred to in applicant's copending application No. 653,892 according to which the spouts of the filling device are provided with members which during the elevation of the filling device gradually as the discharge of the measured amounts through the spouts proceeds interrupt the expulsion of said mass through the spouts automatically in that moment the desired amount of the mass has been expelled through each of the spouts. According to this prior application the strings of the mass expelled through the spouts are separated from the spouts by a cutting member which in the desired moment of the elevation of the filling device is moved automatically across and through the strings. This manner in separating the expelled mass from the spouts has proved not to be quite satisfying neither if the mass to be expelled through the spouts is relatively liquid nor if the mass is relatively stiff, however still plastic. In the first event, however, the separation of the expelled mass from the spouts by means of a member which is moved transversely across the mouthend of the spouts is not sufficient to prevent a further smaller amount of the mass is successively discharged from the spouts and received by the pockets, thus causing an undesired supplement to the amounts already received by the pockets. In the second event which means when the mass is relatively stiff, the separating or cutting member referred to has a tendency to move the portion of the string adjacent the mouthend of the spout transversely of same, thus causing the portion of mass to adhere either to the surface of the spout or to the separating member itself which causes disturbances in the continuous function of the plant in question because such portions of the mass having adhered to the surface of the spout or the cutting member have to be removed. However, since the spouts in machines of the kind referred to are not easily accessible during the operation of the machine, and since the spouts are located relatively close to the surface of the table in which the freezing pockets are located, it would be necessary to interrupt the operation of the machine in order to clean the cutting device and the mouthend of the spouts from matter deposited on same. Consequently, the separation of the expelled strings from the mouthends of the spouts by means of members moved transversely through said strings is merely applicable if the consistence of the mass is not too stiff and not too liquid.

In practice, it is required that plants of the kind referred to should be able to operate continuously irrespectively whether or not the swelled mass in question is more or less viscous and irrespectively whether or not the mass is more or less cooled prior to the discharge of same through the spouts.

The invention deals with the purpose of meeting this requirement and to this end, each of the spouts provides a collapsible portion and is fitted with a member which hereinafter is called the squeezing member and may be either a separating member for each individual spout in question or a member for a number of spouts which member is arranged to automatically squeeze a portion of the spout in question when a desired amount of mass has been discharged through the spout.

The said spouts may be prepared wholly or partly from a flexible or resilient material, e.g., rubber or buna or a textile.

As a result of the squeezing of the spouts for the purpose to separate the expelled strings of the mass from the spouts, the amount of mass located within each spout above the squeezing region of same is surely separated from the string of mass below the said region which ordinarily is the mouthend of the spout. Since the squeezing members adapted to liberate the expelled strings from the mouthends of the spouts would not come in contact with the expelled strings or with the mass within the spout, the squeezing member would not be contaminated and no cleaning of said members is necessary during the continuous operation of the machine in question.

Figure 2:
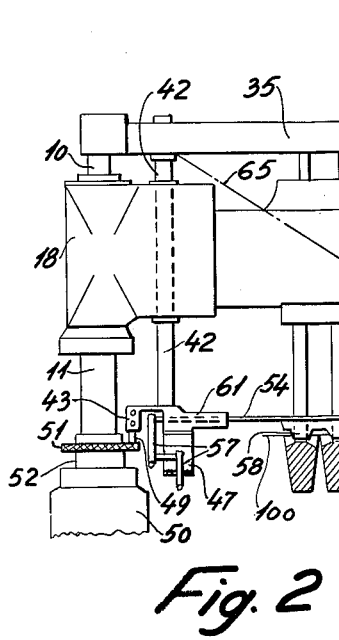
Figure 3:
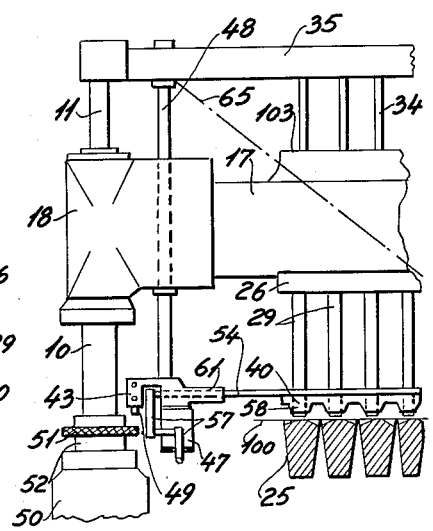
Figure 8:
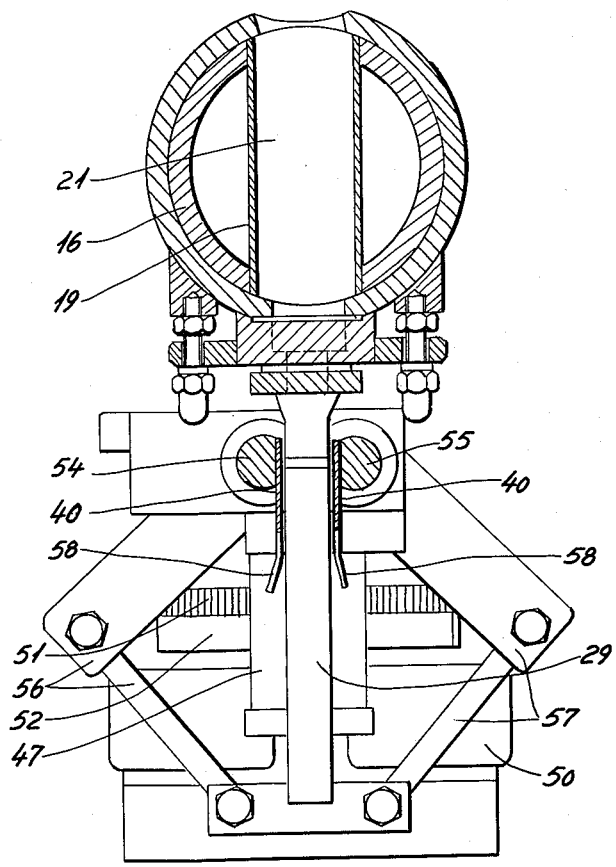
Figure 9:
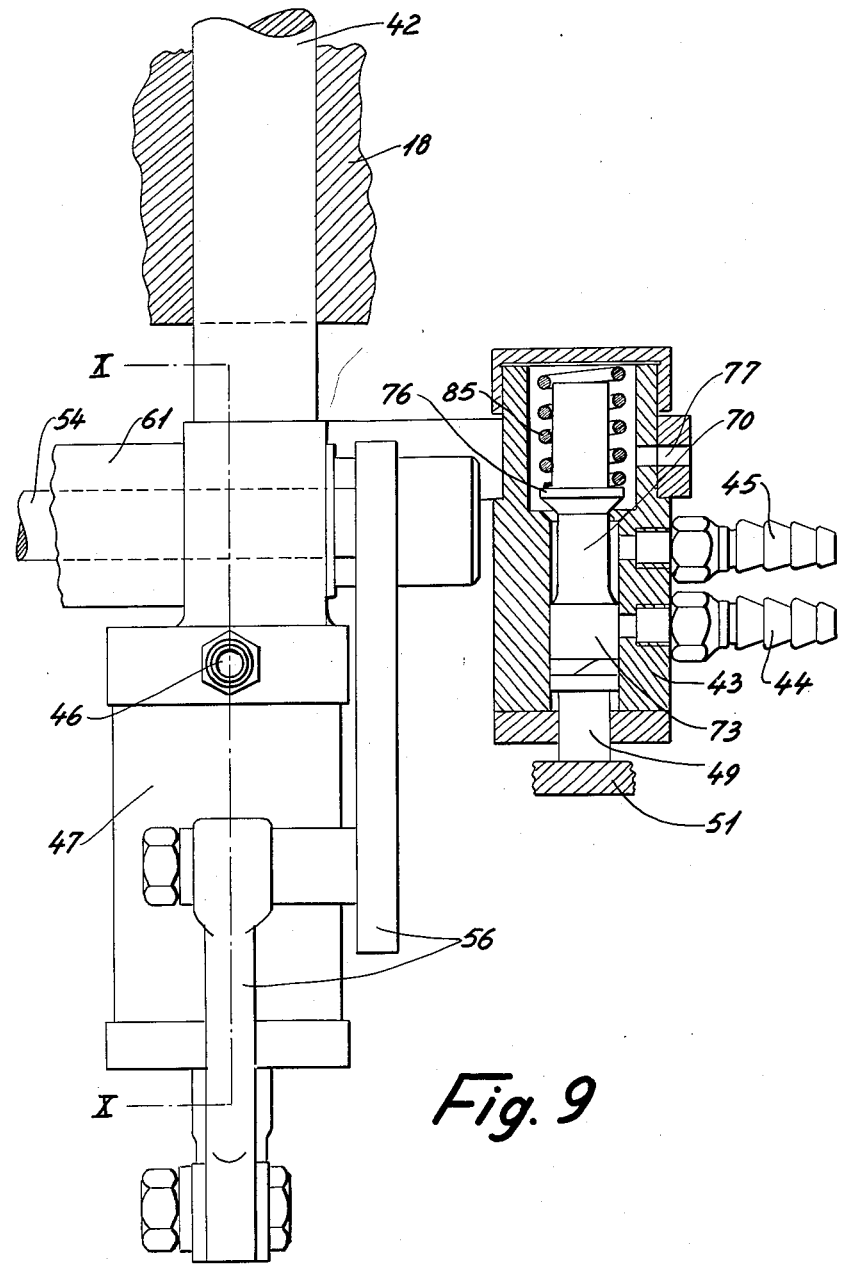
Figure 10:
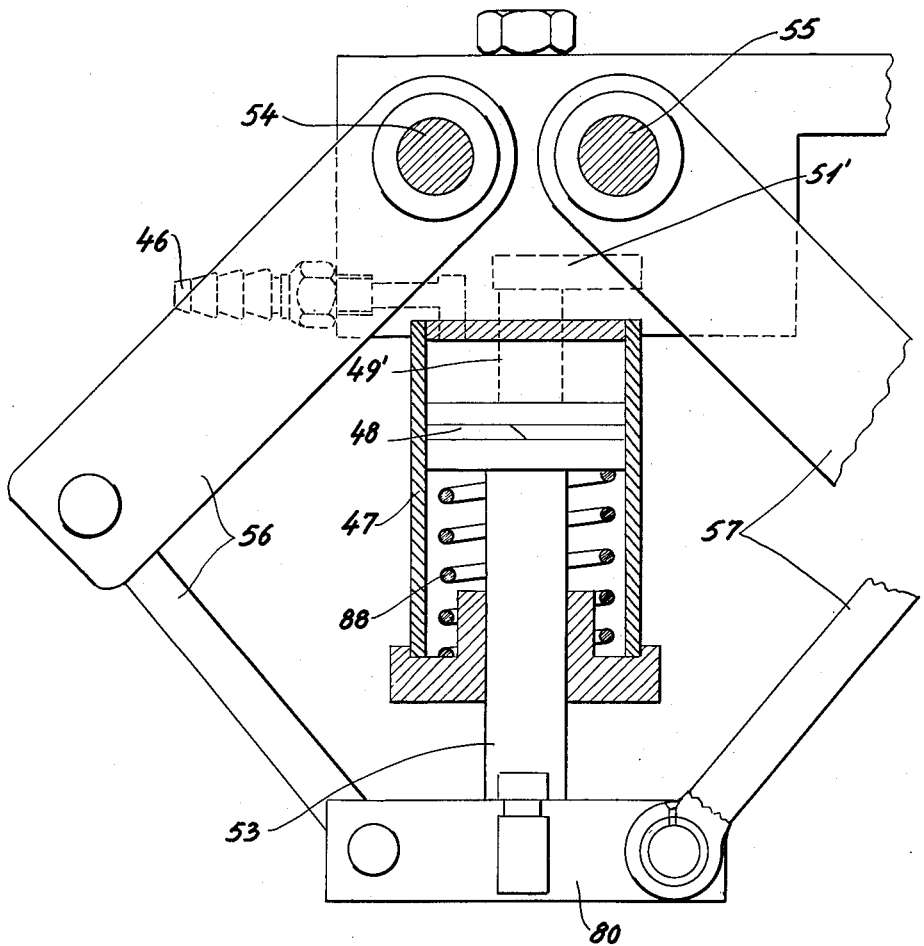

In the drawing:

Figs. 1 to 3 show schematically in side elevations and in three different operation positions respectively a plant of a substantially well known performance for filling a number of freezing pockets simultaneously each with a measured amount of pre-frozen cream, which filling device is fitted with pneumatically operated members adapted to squeeze the discharge spouts of the device in dependence of the filling operation, Fig. 4 is a cross-section in a larger scale along the line IV—IV in Fig. 1 with a spout in an open condition, Fig. 5 is a longitudinal section of a discharge spout of the device according to Figs. 1 to 3 with the mouthend of the spout in a squeezed condition, Figs. 6 and 7 show spouts with different embodiment of squeezing members in side elevations, Fig. 8 is in a larger scale a device for a pneumatical control of the squeezing of the spouts of a filling mechanism in side elevation partly in section along the line IV—IV in Fig. 1, Fig. 9 is a detail of same in side elevation, Fig. 10 is another detail of same in front elevation partly in section along the line X—X in Fig. 9.

Figs. 1–3 in the drawing show a filling apparatus of the kind described in the specification of the pending U.S. application Serial No. 653,892 and U.S. patent specification No. 2,700,347. The details of said apparatus and its manner in operating would clearly appear from said prior specifications. According to the present invention the spouts 29 through which measured amounts of a viscous material is to be discharged into pockets 25 in a rotatably mounted table 100, Figs. 1–3, are prepared from a flexible material, as referred to above, and otherwise the said apparatus distinguished from the previously known filling apparatus referred to above by the feature only that the apparatus is fitted with means for automatically squeezing the spouts when the desired amount of viscous material has been discharged into the pockets 25. Different embodiments of said means are described below.

The viscous material, e.g. a cream of any kind used for the purpose of preparing so-called ice sticks is supplied under a pressure being higher than the atmospheric pressure to the distributing chamber or chambers 103, Figs. 1–4, of a filling apparatus 16, 17, 18, 21, through a conduit 101 and is from said chamber or chambers 103 discharged into measuring chambers 21 in a rotary drum 16, Figs. 1 and 4, which is rotatably mounted in the casing 17 of said filling device having a number of measuring chambers 21. One measuring chamber 21 is shown in Fig. 4. As described in the prior specifications referred to above each of the measuring chambers 21 contains a piston 22, being forced to move to the bottom end of said chamber when a viscous material under pressure is fed to the measuring chambers through the openings 23, Fig. 4, from a source of cream not shown. The lower end of each measuring chamber communicates with a separate aperture 60 in the wall of the drum 16, and each of said apertures 60 communicates through a separate portion of a gutter 26 with a mouth piece or nozzle 26a to which a spout 29 prepared from a flexible material is attached. The casing 17 is carried by a holder 18 which as it appears from the prior specifications referred to above is mounted upon a vertically disposed piston 10 located in a stationary cylinder 50 and arranged to be adjusted hydraulically to move the filling apparatus periodically up and down relatively to the table 100, Figs. 1–3.

The arrangement and the manner of operation of the filling apparatus referred to above is well known in the art except that the spouts 29 has hitherto not been made from a flexible material. Shortly explained the said apparatus is operated in the following manner.

When a viscous or paste material such as a cream for preparing ice sticks or a cream of chocolate or similar matter has been introduced in all of the measuring chambers 21 and the pistons 22 have consequently been displaced to the bottom ends of the measuring chambers, the filling apparatus 16, 17, 18 is lowered by the piston 11 from the position shown in Fig. 3 to the position shown in Fig. 1, in which latter position the lowermost ends of the spouts 29 are situated near the bottom of the pockets 25 of the table 100, whereafter the drum 16 is automatically rotated through an angle of 180° about its axis. Then the pistons 22 would be situated in the uppermost portion of the measuring chambers 21 each immediately below the lowermost ends of a number of vertical rods 34 which are mounted upon a horizontally disposed bar 35, said bar being supported by a vertically disposed hydraulic piston 10. Thereafter the filling apparatus 16, 17, 18, 21 is slowly elevated by means of the piston 11 and since the pistons 22 are prevented from partaking in the elevation of the filling apparatus the said pistons would be subject to a displacement relative to the measuring chamber 21 so as to cause the material disclosed in said chambers to be discharged through the spouts 29 into the pockets 25 until all of the material from each measuring chamber has been discharged. Then the filling apparatus has been elevated to the position shown in Fig. 2 in which the lowermost ends of the spouts are at a level of the uppermost portion of the pockets 25. During subsequent elevation of the portion 10, 34, 35 of the filling apparatus, viz. by means of the piston 10 the spouts are withdrawn from the said pocket and moved to the position shown in Fig. 1, in which the lowermost ends of the spouts are at a level slightly above the upper surface of the table 100. The said subsequent elevation of a portion of the filling apparatus causes said portion to move from the position in Fig. 2 to the position in Fig. 1 as it would appear from the prior specifications referred to, thus causing the lower ends of the rods 34 to be removed from interference with the rotatably mounted drum 16.

If the material is to be discharged through a spout is of a very viscous consistence, e.g. such as ice cream having been cooled to a temperature below the freezing point, the said material may be disinclined to slip the spouts at the end of the discharge operation when the pressure upon the cream below the piston 22 in the measuring chamber ceases. Then a body of said material would be situated between the mouth end of each of the spouts 29 and the material received in the appurtenant pocket 25 and said body of cream or like material would, if not separated from the spout prior to a subsequent stepwise rotation of the table 100, be smeared upon the upper surface of the table 100 when rotated and would further, if separated from the spout simply by the rotation of the said table, cause the bodies of cream left into the pockets 25 of the table to get an irregular free upper surface, since the very viscous material is not inclined to smooth said surface by settling during the influence of gravity.

In order to insure that the surface of the rotary table 100 is not continued by the viscous material in question and additionally in order to secure that the free surface of the viscous material discharged in the pocket should have a regular, smooth condition, the spouts of the filling apparatus are, according to the invention, to be fitted with means for squeezing the spouts, preferably the mouth ends of same automatically when the measured amounts of the viscous material have been discharged into the pockets 25. To this end the spouts are as referred to above prepared from a flexible material preferably a resilient material allowing each individual spout to be squeezed transversely so as to shear the body of material in same at the mouth end of the spout, and this squeezing of each spout may be effected either by means of squeezing members which may be common to a number of spouts, or by means of individual squeezing members mounted upon or within the wall of each individual spout or in forming each spout so as to be self-closing due to the resiliency or flexibility of the material from which the spout is prepared when the pressure exerted on the viscous material passing the spout during the discharge operation, ceases.

In case the viscous material to be discharged through the spouts 29, Figs. 1–4, has a very sluggish condition it would ordinarily be necessary to squeeze the spout by means of separate members other than such squeezing members which are embedded in the material of the spout itself. An embodiment of such separate squeezing members and the manner in operating same is described below with reference to Figs. 1 to 10.

In Figs. 1–3, 42 is a vertical rod which rid is supported on the piston 10, e.g. in being attached to the bar 35 carrying the rods 36. The said rod 42 extends downwardly on to a stationary member 61 carrying a valve 43 adapted to control the supply air under pressure from a source, not shown, to a cylinder 47 at the termination of each discharge operation of the filling apparatus as more especially referred to below. The said air under pressure is supplied to a stud 44, Fig. 9, on the valve 43 and is to be supplied from an outlet stud 45 on said valve to a stud 46, Fig. 10, on said cylinder 47 through a conduit, not shown, interconnecting the studs 45 and 46.

The piston 48, Fig. 10, is a piston located in the cylinder 47 and arranged to operate two knee-joints 56 and 57 connecting each a rotatably mounted shaft 54 and 55 respectively to the piston rod 53 of the piston 48. The said two shafts 54 and 55 and the cylinder 47 and are mounted upon a member 61 the valve 43 are supported by the valve carrying member 61 referred to above, and this member is so supported upon the stationary member 50 of the machine in question and upon the rod 42 that the member 61 is able to partake in the elevation or a portion of the elevation of the piston 11 when said piston is caused to elevate the rods 34 from the position of same as shown in Fig. 2 to the position of same as shown in Fig. 3, relatively to the filling device 16, 17.

The valve 43, Fig. 9, discloses an adjustable valve member 70 comprising a piston portion 73, and a valve body 76 and a piston rod 49 extending slightly through the bottom end of said valve. When the filling apparatus occupies the positions shown in Figs. 1 and 2 and any position between said two positions, the supporting member 61 and consequently the valve 43 and the cylinder 47 and the shafts 54 and 55 mounted on said member 61 are stationary, and the piston rod 49 is then engaged by a member 51, which is mounted upon the stationary portion 50 of the machine referred to so as to be adjustable in a vertical direction relative to said stationary portion 50. The member 51 is so adjusted as to cause the piston rod 49 when engaging said member 51 to be pushed to a position within the casing of the valve 43 in which position, as shown in Fig. 9, the piston portion 73 of the valve member 70 obstructs any flow of air from the stud 44 to the stud 45. Then the piston 48 in the cylinder 47 would, under the influence of a helical spring 88 located in said cylinder, be moved to the position shown in Fig. 10 in which said shaft by means of the knee-joints 56 and 57 causes the shafts 54 and 55 to occupy the positions shown in Fig. 4 in which two squeezing members 40 mounted upon said shafts and located at opposite sides of a plurality of spouts 29 as more especially referred to below are adjusted to positions in which said members 40 are out of engagement with said spouts. Thus the squeezing members 40, comprising each an oblong preferably metallic rail or strip extending along the row of spouts 29 would be out of engagement with the spouts during the period of discharge of material from the measuring chambers 21. When the filling apparatus, during elevation from the position shown in Fig. 1 to the position shown in Fig. 3, passes the position shown in Fig. 2 in which the discharge of material from the measuring chamber is terminated and the piston 10 starts to elevate the rods 35 as mentioned above, the piston 10 moves the rod 42 upwardly thus causing said rod to elevate the member 61, carrying the valve 43. Then the piston rod 49 is removed from the member 51, and this causes a spring 85 located in the house of the valve 43 to displace the valve member 70 to a position in which the piston portion 73 of said member is displaced to allow air under pressure, supplied to the supply stud or nozzle 44 to flow to the stud 45, from which the said air flows to the cylinder 47 and operates the piston 48 so as to cause the two knee-joints 56 and 57 to rotate the two shafts 54 and 55 of the squeezing members 40 in mutually opposite directions through angles sufficient to cause the said member 40 to squeeze the mouth ends of the spouts 29 as shown in Fig. 5.

During a subsequent lowering of the filling apparatus the piston 11 would partake in the first relatively short portion of said lowering and the member 61 together with the members mounted on same is thereby caused to move downwardly until the piston rod 49 of the valve 43 engages the stationary, however adjustably mounted member 51 and thereby is caused to shift the valve member 70 to the position shown in Fig. 9, in which the said valve member blocks the passage of air from the stud 44 to the stud 45 and at the same time elevates the valve portion 76 from its seat, thus establishing a free passage for the air from the cylinder 47 through the stud 45 and a vent 77 to the free atmosphere. The spring 88 in the cylinder 47 would then shift the piston 48 to the position shown in Fig. 10 whereby said piston turns the shafts 54 and 55 and consequently the squeezing rails 40 to the position shown in Fig. 4, thus allowing the spouts 29 to be subsequently freely lowered independently of the squeezing members 40.

Each of the squeezing members 40 has facing each spout 29 a downwardly directed slightly curved tongue 58 which wholly or partly may extend down into the upper portion of an adjacent pocket 25 when the filling apparatus is in the position indicated in Fig. 2.

The shafts 54 and 55, being at one end rotatably mounted in the member 61 may at their opposite ends be supported in any suitable manner upon the rod 42 or upon the piston 10, e.g. as shown in dotted lines in Figs. 1 to 3 by means of braces 65 extending between the uppermost portion of the rod 42 or of the piston 10 and a separate member, not shown, in which the last mentioned ends of said two shafts are journalled.

In the embodiment of the squeezing device described above in connection with Figs. 1 to 10 the squeezing members are operated pneumatically. This manner in operating is an example only. If preferred the shafts 54 and 55 of the device 40 may be operated mechanically. To this end the valve 43 is dispensed with and the member 51 is then fitted with a projection 51' as indicated with dotted lines in Fig. 10, which projection is arranged to extend over the upper end of the cylinder 48 so as to engage an upwardly extending end 49' of the piston rod 53. When the piston 10 moves upwardly as described above to elevate the bar 35 and the rod 42 relative to the filling device 16, 17, 18 and 21, the member 61 supporting the squeezing device is at the same time elevated, however the stationary projection 51' would prevent the piston 48 from partaking in the elevation of the member 61 and consequently the piston 48 would be displaced relatively to the cylinder 47 so as to operate the knee-joints 56 and 57 and thus to rotate the shafts 54 and 55 of the squeezing members 40 so that these members would squeeze the spouts. During a subsequent lowering of the piston 10 as referred to above the piston 48 is released from the influence of the projection 51' and by means of the spring 88 caused to return to a position in which it moves the squeezing members 40 out of engagement with the spouts.

In the embodiment described above with reference to Figs. 1 to 10 the complete squeezing device is elevated from the position in Fig. 2 to the position in Fig. 3 at the termination of the filling operation. This arrangement is a preferred one because it enables the squeezing action to be started and, if desired, to be fulfilled while the tongue 58 of the squeezing members 40 are still situated within the upper portion of the pockets 25, and this arrangement ensures that the spouts are closed by the squeezing members before their mouth ends, during the elevation of the squeezing device referred to, pass the level of the surface of the table 100. Consequently, no cream would be lost upon said surface from the spouts. It is, however, within the scope of the present invention to mount the supporting member 61 so as to be stationary and to keep the squeezing members permanently at a certain level slightly above the surface of the table 100, viz. at the same level as appears from Fig. 3 and then the rod 42 is to be so arranged as to move the piston 48 mechanically, as described above, or to shift the valve 43 to operating position during the elevation of said piston from the position in Fig. 2 to the position in Fig. 3 without simultaneously causing any elevation, or lowering, of the supporting member 61.

I claim:

1. A machine for dispensing frozen food products from a swelled moldable mass comprising in combination a device for receiving said mass and having a number of measuring chambers to receive measured amounts of said mass, a number of downwardly directed collapsible spouts each corresponding with one of said measuring chambers, means for moving said device together with said spouts alternately upwardly and downwardly, and members for collapsing said spouts automatically in dependence of the upwardly directed motion of said device when during said upwardly directed motion the mouth ends of the spouts have been elevated to a certain level.

2. A machine for dispensing frozen food products from a swelled moldable mass comprising in combination a device for receiving said mass and having a number of measuring chambers to receive measured amounts of said mass, a number of downwardly directed collapsible spouts each corresponding with one of said measuring chambers, means for moving said device together with said spouts alternately upwardly and downwardly, and pneumatically controlled members for collapsing said spouts automatically in dependence of the upwardly directed motion of said device when during said upwardly directed motion the mouth ends of the spouts have been elevated to a certain level.

3. A machine for dispensing frozen food products from a swelled moldable mass comprising in combination a device for receiving said mass and having a number of measuring chambers to receive measured amounts of said mass, a number of downwardly directed collapsible spouts each correspondingly with one of said measuring chambers, means for moving said device together with said spouts alternately upwardly and downwardly, members for collapsing said spouts, and pneumatically operated means for controlling the adjustment of said collapsing member in dependence of the upward and downward motion of the device for separating measured amounts from the said mass to cause the spouts to be collapsed automatically during an elevation of said device and to be liberated for the collapsing action during a subsequent downward motion of said device.

4. A machine according to claim 3 in which the squeezing members comprise two rotatably mounted shafts each extending transversely of a number of vertically disposed spouts at mutually opposite sides of said spouts, and a number of collapsing wings mounted on said shafts in positions transversely of same and extending each along the external surface of an adjacent one of said spouts so as to be moved against same if the appurtenant shaft is rotated a certain angle about its axis in one direction and to move out of engagement with the spout in question if the shaft concerned is rotated in the opposite direction, and comprising a reciprocable member for rotating said shaft and an operating member mounted on the device for separating measured amounts from the mass to be fed through the spouts and engaging said reciprocable member to cause same to adjust the positions of the collapsing member as referred to in dependence of the upward and downward motion of said device.

5. In a method of conveying a number of measured amounts of a swelled moldable mass adapted for freezing from a filling device for separating measured amounts from said mass down into a corresponding number of pockets arranged each to receive a separate one of said amounts through a separate spout having a collapsible portion supported by said device and providing a collapsible portion, the steps of lowering said device to a position in which each of said spouts extends deeply into an individual one of said pockets, then subjecting measured amounts of the moldable mass in said device to pressure and subsequently elevating said device gradually as the discharge of said amounts through said spouts proceeds due to the action of said pressure until the mouthends of the spouts are elevated to a level being not lower than the level to which said pockets are to be filled by the said measured mass and finally collapsing each of said spouts automatically in dependence of a continuation of the elevation of said device in order to liberate the spouts from the mass discharged therethrough.

6. In a method of conveying a number of measured amounts of a swelled moldable mass adapted for freezing from a filling device for separating measured amounts from said mass down into a corresponding number of pockets arranged each to receive a separate one of said amounts through a separate spout having a collapsible portion supported by said device and providing a collapsible portion, the steps of lowering said device to a position on which each of said spouts extends deeply into an individual one of said pockets, then subjecting measured amounts of the moldable mass in said device to pressure and subsequently elevating said device gradually as the discharge of said amounts through said spouts proceeds due to the action of said pressure until the mouthends of the spouts are elevated to a level not lower than the level to which said pockets are to be filled by the said measured mass and collapsing each of said spouts automatically in dependence of a continuation of the elevation of said device in order to liberate the spouts from the mass discharged therethrough, and finally liberating the spouts automatically from the squeezing action in dependence of a subsequent lowering of said device.

References Cited in the file of this patent

UNITED STATES PATENTS

| | | |
|---|---|---|
| 920,250 | Blakeslee | May 4, 1909 |
| 2,107,987 | Johnson | Feb. 8, 1938 |
| 2,136,224 | Weinreich | Nov. 8, 1938 |
| 2,310,413 | Friden | Feb. 9, 1943 |
| 2,761,605 | Pahl et al. | Sept. 4, 1956 |
| 2,817,461 | Gilberty | Dec. 24, 1957 |